United States Patent [19]
Albsmeier et al.

[11] 3,823,470
[45] July 16, 1974

[54] METHOD AND APPARATUS FOR TRIMMING MECHANICAL FILTERS

[75] Inventors: Hans Albsmeier, Munich; Alfhart Günther, Haar, both of Germany

[73] Assignee: Siemens Aktiengesellschaft, Berlin & Munich, Germany

[22] Filed: Sept. 24, 1971

[21] Appl. No.: 183,404

[30] Foreign Application Priority Data
Sept. 30, 1970 Germany............................ 2048125

[52] U.S. Cl..................................... 29/593, 333/71
[51] Int. Cl. ........................ G01r 17/00, H03h 9/00
[58] Field of Search ................ 29/592, 593; 333/71; 235/151.1, 151.11

[56] References Cited
UNITED STATES PATENTS

| 2,617,882 | 11/1952 | Roberts.............................. 333/71 |
| 3,559,256 | 2/1971 | Lemelson.................. 235/151.11 X |
| 3,621,547 | 11/1971 | Durham, Jr....................... 29/593 X |
| 3,674,995 | 8/1970 | Kendall............................ 235/151.1 |

FOREIGN PATENTS OR APPLICATIONS

| 822,536 | 10/1959 | Great Britain.................... 333/71 X |
| 947,145 | 1/1964 | Great Britain.................... 333/71 X |

Primary Examiner—Granville Y. Custer, Jr.
Assistant Examiner—J. W. Davie
Attorney, Agent, or Firm—Herbert L. Lerner

[57] ABSTRACT

Mechanical filters composed of mechanical resonators previously individually trimmed to design resonance frequencies, which are coupled to each other in succession by mechanical coupling elements, are subjected to trimming after assembly as determined by measurement of the coupled oscillations of the completed filter. This measurement is carried out under control of a computer appropriately linked by other equipment to the filter transducers. The computer identifies the frequencies of coupled oscillations and their differences from design values, and calculates the variation from design values of one or more elements of the corresponding filter matrix. By these values the computer develops settings for a trimming device for successively trimming elements of the filter such as resonators, or coupling elements, or both. In the most simplified arrangement and method, only variations of the null condition of one matrix element are considered, and the derived corrections are applied in equal parts to each of symmetrically disposed paired coupling elements.

10 Claims, 6 Drawing Figures

METHOD AND APPARATUS FOR TRIMMING MECHANICAL FILTERS

The invention concerns a method for trimming a mechanical filter that consists of a number of mechanical resonators coupled in succession by mechanical coupling elements, with at least the end resonators connected to electro-mechanical transducers, by which a prescribed transmission characteristic may be obtained by modification of individual filter elements.

Mechanical filters are known to be notably superior to those consisting of lumped circuit elements in the frequency region for which the former are particularly suited, among other reasons because along with small space requirements, they exhibit a high Q for the individual resonator as well as a high coupled time constant, with a relatively high constancy with respect to temperature. On account of unavoidable manufacturing tolerances and variations of material property, it is not possible, however, to obtain directly in a filter the theoretically prescribed transmission characteristics and it is therefore necessary to correct the individual filament elements in such a way that the transmission characteristic of the filter will differ as little as possible from that theoretically prescribed. This correction of the individual filter element is generally referred to as "trimming."

In general the properties of a mechanical bandpass filter may be said to be determined by the resonance frequencies and the masses of the individual resonators as well as by the stiffness of the couplings. These three magnitudes are subject to deviations from their design values resulting from unavoidable material and fabrication errors. Although the resonators lend themselves to setting of their resonance frequencies in a simple way in the course of their manufacture, a correction of the mass error is in general out of the question as much for economic reasons as on account of the risk of an unwarranted change of the equivalent circuit. Trimming of the couplers would be possible only on completed filters, since coupler errors arise basically from variations in assembly. A repetitive trimming after manufacture of the couplers of a completed filter carried out by hand with simultaneous observation of the filter response is also excluded, because the filter response for each frequency depends in a complicated way on the totality of the elements and a modification of a mechanical filter element once accomplished is generally irreversible.

For these reasons it has usually been the practice heretofore to trim the resonators to their design frequency before the assembly of the filter and to hold the material and assembly errors to a limit small enough that the deviation in filter behavior from the designed transmission characteristics remain sufficiently small. There are technical and economic limits to this sort of procedure, however, in the case of more exacting requirements for a filter, for example, matching with a reflection factor $r < 5\%$, compared to previous requirements of $r \approx 10\%$, or a requirement on the phase characteristic.

By the present invention a procedure for trimming mechanical filters is provided which enables desired corrections to be made to individual filter elements to higher levels of precision while avoiding irreversible over-correction by making the trimming process fully automatic under the control of a process computer that directs all the necessary measures for filter trimming.

To reach such a result according to the invention, in the trimming of a mechanical filter composed of a number of mechanical resonators successively coupled by mechanical couplings, with at least the end resonators connected to electro-mechanical transducers, the filter is excited into mechanical operation by one of the transducers, the oscillations are detected and the frequencies of the measured maxima and minima of these oscillations are measured with the other transducer either open-circuited or short-circuited, the frequencies so measured are then subjected to a design or theoretical value vs. actual value comparison and the resulting frequency differences are then caused to determine the settings of a trimming device by which the individual filter elements are trimmed in accordance with the settings.

For the understanding of the invention it is useful to consider that the characteristics of the filter are fully determined by the four elements of the chain matrix:

$$K = \begin{bmatrix} A_1 & B \\ C & A_2 \end{bmatrix}$$

The resonant frequencies are relatively easily measurable and very sharp criteria which in the four extreme operating conditions, namely $$R_1 = 1/R_2 = 0, \infty$$
$$R_1 = R_2 = 0, \infty$$

correspond to the cases in which each of the matrix elements $A_1$, $A_2$, $B$, $C$, respectively have the value of 0. $R_1$ and $R_2$ represent the terminating resistances of the filter. The number of 0 positions (i.e., positions on the frequency axis where one of the matrix elements has the value zero) is sufficient to determine, with the help of the 0 position error, all of the element value errors. Because of the small magnitude of the errors, an approximately linear relationship between the 0 position errors and the element errors is to be expected.

It is, therefore, according to the invention an advantage to measure the 0 positions of the matrix elements, to determine the element errors from the 0 position errors and to use the element errors as initial value for a filter trimming operation.

In particular a substantial simplification is to be recommended in which simply the 0 position of the matrix element C of the filter to be trimmed is measured, this matrix element being defined by the equivalent circuit shown in FIG. 2 explained below, and then to apply the correction calculable therefrom for the resonator frequencies and mechanical couplings. These are composed of one term for partial correction of the coupling errors proper and another term providing a partial correction of the effect of the mass errors of the resonators connected to each other through the respective couplings, whereby on account of the symmetry of the circuit and of the operation conditions, hence on account of the resulting equivalence of symmetrically located elements, the desired corrections are to be equally divided between symmetrically disposed elements.

The necessary correction to the resonator frequencies, as a result of the balancing out of mass errors at the couplings are therefore as a rule so small that their effect can be neglected.

The invention is explained in more detail below by references to illustrative embodiments.

Figure 1:
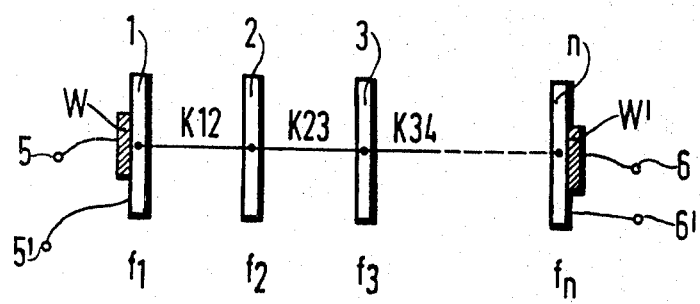
FIG. 1 is a diagrammatic representation of a filter composed of a number of mechanically coupled mechanical resonators.

FIG. 1 shows a mechanical filter comprising a number of resonators 1, 2, 3 . . . n. The individual resonators are successively coupled with each other through the couplings K12, K23, K34 . . . and the dashed line between resonators 3 and n is intended to indicate that additional resonators and couplings, as many as may be desired, can be provided there. The end resonators of the filter, to wit, resonator 1 and resonator n, are respectively connected to electromechanical transducers W and W'. The transducers consist, for example, of small plates of piezoelectric material that are directly affixed respectively to resonators 1 and n, which are composed of a metallic material.

The piezoelectric wafers are provided with a metallized layer on the side thereof facing away from the resonator. It may be assumed that transducer W is the input transducer and that transducer W' represents the output transducer, that in the illustrative embodiment shown the resonators operate in a flexure mode, and that their coupling is effective by coupling elements attached to the resonators in the region of their maximum oscillation amplitude. If any oscillating electric potential is applied to the input terminal 5, 5' this potential is translated into mechanical oscillations by the transducer W, which oscillations are translated back into electrical oscillations at transducer W' and can be detected at terminals 6, 6' as an alternating electrical potential.

Figure 2:
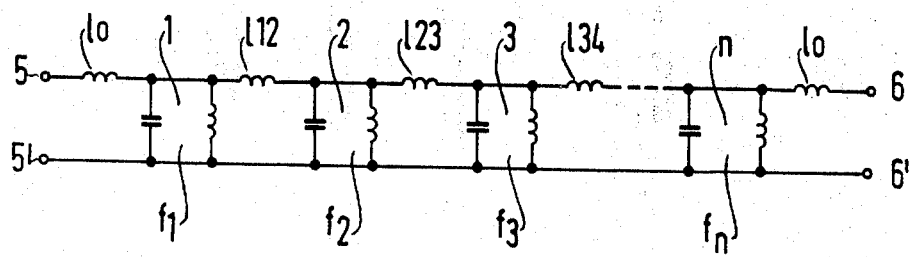
FIG. 2 is a diagram of the electrical equivalent circuit of a mechanical filter such as shown in FIG. 1.

A simplified electrical equivalent circuit of the mechanical filter shown in FIG. 1 is represented in FIG. 2, which shows a ladder network, in the shunt branches of which, the resonant circuits 1 to n are located. The individual resonant circuits are successively coupled to each other by coupling inductances L12, L23, L34 . . . that are located in the series arms of the network. Resonant circuits 1 to n directly correspond to resonators 1 to n of FIG. 1 so that the resonant frequencies $f_1, f_2, f_3 \ldots f_n$ of the resonators and of the oscillatory circuits likewise match. The electro-mechanical transducers W and W' are represented in the equivalent circuit by the coils $L_o$ located respectively in the input series arm and in the output series arm.

In accordance with the considerations set forth above, the output terminals 6, 6' of the transducer W' are either left unconnected (open-circuited) or are short-circuited by a direct connection. The filter is then excited into mechanical oscillations by an alternating potential of variable frequency applied to the terminals 5, 5'. The amplitude of these oscillations is then detected, and the frequencies of maxima and minima are measured. This can be done, for example, in the case of an open-circuited termination by means of a voltage measuring circuit of extremely high resistance connected to the output terminals 6, 6'. In the case of short-circuited termination, the voltage measuring circuit meter is to be replaced by a suitable current measuring circuit of extremely low resistance. The frequencies of the measured maxima and minima correspond practically to the free resonance oscillations of a mechanically coupled mechanical system, i.e., unloaded on both input and output sides, and it is common to refer to these frequencies by the term "coupled frequencies." By network analysis carried out prior to filter trimming, the design coupled frequencies can be precisely determined, so that the trimming of the filter becomes a matter of bringing the measured coupled frequencies as exactly as possible into accord with the calculated values. For this purpose the frequencies of the measured maxima and minima, as further explained below, are subjected to a theoretical vs. actual value comparison and, from the resulting frequency differences, the magnitude settings for a trimming apparatus are then obtained. The trimming apparatus in turn performs the trimming of the individual filter elements in proportion to these setting values.

In place of a short-circuited or open-circuited termination, the output transducer W' can also be terminated by a reactance network, as, for example, an electrical terminating network.

The trimming operation is particularly facilitated if the individual resonance frequencies of all resonators are already tuned to their design or theoretical values, and if the electro-mechanical input and output coupling elements, represented by the inductances $L_o$ in FIGS. 1 and 2, can likewise be measured in advance and suitably adjusted. Thereafter it is sufficient in almost all cases to deal with or consider only symmetrical element filters and to confine the operation to the correction of small errors.

As a rule it is sufficient to operate only with the 0 positions of the open circuit values, i.e. the matrix element C of the circuit matrix. For the trimming of symmetrical element filters, it is sufficient to divide the amounts of trimming so determined into equal operations on symmetrically disposed filter elements.

It is furthermore possible to carry out the measurement of actual frequency values with either mechanically free or mechanically fixed (clamped) filter ends. In that case the excitation resp. detection of oscillation can take place by electro-magnetic or electro-acoustic transducers and the velocity resonances of the filter body can be used for trimming criteria.

When relatively precisely pre-adjusted resonators 1 to n are used, the trimming operation most commonly needs only to be carried out on the coupling elements K12, K23 . . . .

The null settings of the matrix element C are determined by the operation characteristics of the equivalent circuit, FIGS. 1 and 2, with both ends open-circuited, and hence as postulated take no account of the electro-mechanical external coupling elements $L_o$ of FIGS. 1 and 2. In accordance with the force-current analogy used relating to FIGS. 1 and 2, this operation condition corresponds to a mechanical filter with piezoelectric drive short-circuited on both ends.

The relation between the errors of the elements to which corrections are to be applied and the errors in the null positions represented by the coefficients of the "error matrix" may be determined by analysis once and for all for a particular filter circuit. The correction magnitude for trimming purposes can then be derived from the null position errors of a filter by a "correction matrix" obtained by inversion from the error matrix.

Figure 3:
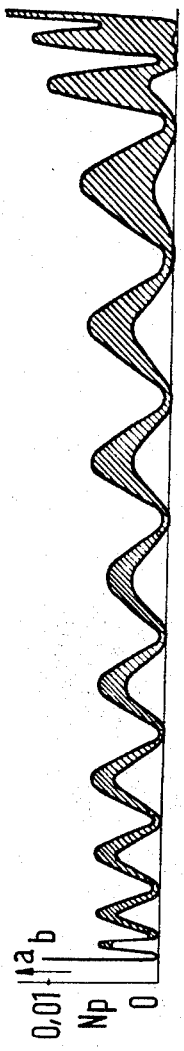
FIGS. 3 and 4 are graphical representations of the distribution of coupling errors before and after corrections to the coupling elements.
Figure 4:
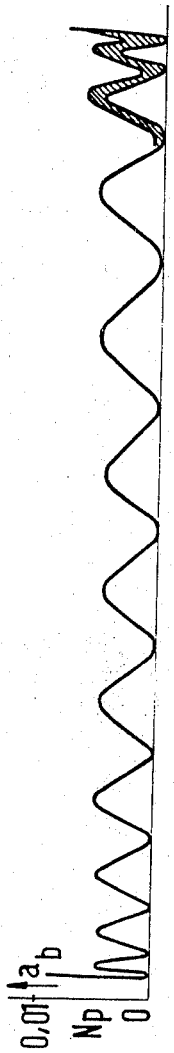

Quite substantial improvements in filter characteristics are obtainable even with great simplification of the process by limiting attention to only one matrix element and regularly applying equal corrections to symmetrically disposed element pairs, so that principally the important contributions of their cumulative errors operating in the same sense are corrected. The example to which the graphs appearing in FIGS. 3 and 4 relate illustrates the extent of this improvement. The coordinates of these graphs are frequency on the horizontal axis and, on the vertical axis, attenuation $a_b$ resulting from filter operation after subtracting the attenuation resulting from circuit losses. FIG. 3 plots the range of filter attenuation $a_b$ for frequencies in the pass band of a large number of mechanical filters produced to the same design characteristics before correction in accordance with the invention. The shaded area of FIG. 3 shows the scatter of the measured values resulting from the distribution of errors of a large number of filters. In this case either the couplings alone or the couplings and masses of a mechanical bandpass structure are subject to errors that are a combination of a systematic error and random errors. The filters that produce the data plotted in FIG. 3 were then subjected to corrections determined, according to the invention, by the correction matrix obtained with the help of the measurement of the error in the null positions of matrix element C for the filter, and the resulting value of the filter attenuation was then plotted, yielding FIG. 4. As may be seen from FIG. 4, the scatter region for the same number of mechanical filters has been remarkably reduced by trimming in accordance with the invention.

For carrying out the trimming there may be used, for example, a sandblasting jet using fine sand, which is well suited for that operation. Since in this operation only a removal of material can be accomplished, the coupling elements must be treated with appropriate caution.

Figure 5:
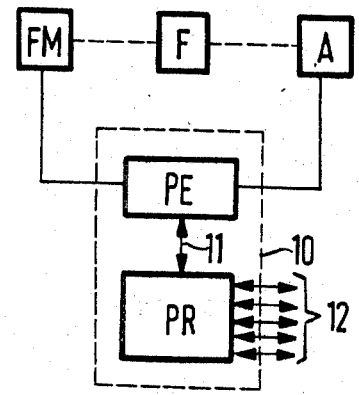
FIG. 5 is a block diagram of the construction of a trimming apparatus in accordance with the invention.

In FIG. 5 an example is shown of an apparatus system in which a process directing computer PR is used to control the determination of the actual value frequencies, the evaluation of the frequency differences, the derivation of the correction magnitude settings, and the command for actually performing the trimming. The circuit designated as contained in the dashed outline 10 includes a process directing computer PR which is connected with a process control element PE by a connection that is operative in both directions as is indicated by the double-headed arrow 11. The process control element PE is connected on one hand with the frequency meter FM which determines the actual value frequencies of the filter F, likewise shown only diagrammatically. It is to be understood that the latter is a filter of the type shown in FIG. 1. The process directing computer together with the process control element closely associated therewith direct the determination of the actual value frequencies and simultaneously evaluate the frequency differences by reference to the desired coupled frequencies stored in the computer memory, that is, the frequencies for the free vibrations of the mechanically coupled system. At the same time, the process directing computer PR calculates the correction magnitude settings and, by means of the process control element PE, directs the operation of the trimming device A on the filter F, i.e., the performance of the trimming of the resonators and coupling elements of the filter F. The trimming operation can, if necessary or desirable, be carried out in several steps, thus for example it may be subdivided into a coarse trimming step and a fine trimming step. It is furthermore possible for the process directing computer PR to control several trimming apparatus units simultaneously as is indicated by the arrows 12. In other words this means that a number of different frequency meters FM and trimming devices A can be connected to the same process directing computer PR, an arrangement that is especially advantageous because better use is thereby made of the great computing capacity of this type of computer.

Figure 6:
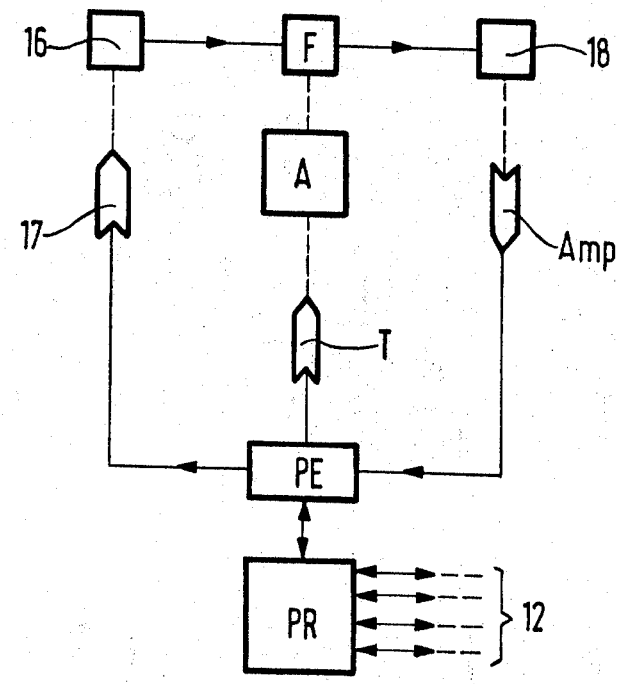
FIG. 6 is a block diagram of another arrangement of apparatus for performing the trimming operation.

FIG. 6 shows a further possibility for automatic trimming of the filter F in accordance with the invention. Here again a process directing computer PR is used in connection with a process control element PE directly coordinated therewith. By the arrows 12 it is again indicated that several trimming devices can be controlled by the process directing computer PR. For exciting oscillations of the filter F, a digital transmitter 16 is used, having an output frequency controlled by the process control element PE by through a frequency control unit 17. The amplitudes Amp of the electrical oscillations detected at the output of the filter F are fed to the process directing computer PR through a receiver 18 and the process control element PE. The process directing computer, in response to the frequency changes of the received amplitude, commands the frequency setting steps for the transmitter 16 necessary for finding all of the resonance frequencies and after the determination of all the resonance frequencies, after the derivation of all of the frequency differences and after the calculation of the element modification magnitudes, transmits the setting magnitudes by means of the process control element PE to the trimming device A for performing trimming operations successively on the proper filter elements.

The trimming apparatus can, for example be provided in the form of a sandblast jet or in the form of a laser. The sandblast jet removes material successively at each of the locations to be trimmed, thus for example at the resonators and the couplings, in quantities just sufficient to bring the actual values of the coupled frequencies to within prescribed limits of equality with the theoretical or desired values. If a laser beam is used for trimming, then the material to be removed from the resonator or coupling may, for example, be removed by vaporization. The irradiating period or the light intensity for the trimming apparatus A can then be controlled by means of the circuit unit T which is in turn controlled by the process control element PE. For trimming a coupling element, it is likewise possible to provide a device that subsequently anneals the material of the coupling element. This can be done if a material is used for the coupling element that possesses an anomaly of the temperature coefficient of the elastic modulus, as has already been previously suggested. In this case, accordingly, the temperature for subsequently annealing the coupling element is controlled through the circuit unit T.

What is claimed is:

1. A method of trimming a mechanical filter composed of several mechanical resonators coupled in succession by mechanical coupling elements in which at least the end resonators of said succession are connected respectively with electro-mechanical transducers comprising the steps of:
  a. exciting mechanical vibrations of the filter by driving one of said electro-mechanical transducers at various frequencies in the operating range of said filter;
  b. detecting the amplitude of said oscillations electrically at the other of said transducers under conditions in which the output of said other transducer is provided with a substantially dissipationless termination;
  c. determining the frequencies for which maxima and minima are detected as the input frequency is varied;
  d. comparing frequencies so determined with the coupled frequencies related to the filter design to obtain respective frequency difference values;
  e. calculating from said frequency difference values the amount of material to be removed from individual resonators and individual coupling elements;
  f. calculating setting magnitudes for a trimming device in order to remove said amount of material, and
  g. operating said trimming device to trim individual elements including resonators, and individual coupling elements, of said filter in accordance with said setting magnitudes.

2. A method as defined in claim 1 in which at least one of said transducers is terminated by a reactive network.

3. A method as defined in claim 1 in which the said other transducer is substantially short-circuited.

4. A method as defined in claim 1 in which the said other transducer is substantially open-circuited.

5. A method as defined in claim 1 in which said filter has symmetrically disposed filter elements which are equally trimmed by said trimming device by applying the trimming determined by one setting magnitude calculation in equal parts to said symmetrically disposed elements.

6. A method as defined in claim 5 in which the determination of said frequencies of said maxima and minima is accomplished either with mechanically free, or with mechanically clamped, filter extremities, and in which the velocity resonances of the filter body are used as trimming criteria.

7. A method as defined in claim 1 in which said resonators are trimmed to the desired frequency beforehand and in which the trimming as specified in claim 1 is applied only to said coupling elements.

8. A method as defined in claim 1 in which the control of the determination of said frequencies of said maxima and minima, the evaluation of said respective frequency differences, the calculation of said setting magnitudes, and the operation of said trimming device is accomplished by means of a process directing computer.

9. A method as defined in claim 8 in which the operation of said trimming device is subdivided into a plurality of steps.

10. A method as defined in claim 8 in which said process directing computer is arranged to control simultaneously a plurality of trimming devices adapted for simultaneously trimming a corresponding plurality of mechanical filters, each of which is simultaneously subjected to the method defined as aforesaid.

* * * * *